B. T. Stowell.
Excavator.

No. 84,230. Patented Nov. 17, 1868.

Witnesses,
C. A. Pettit
L. C. Kamon

Inventor
B. T. Stowell
By Munn & Co
Attorney

United States Patent Office.

BARNA T. STOWELL, OF QUINCY, ILLINOIS.

Letters Patent No. 84,230, dated November 17, 1868.

IMPROVED EXCAVATOR.

The Schedule referred to in these Letters Patent and making part of the same.

*To all whom it may concern:*

Be it known that I, BARNA T. STOWELL, of Quincy, in the county of Adams, and State of Illinois, have invented a new and improved Excavator; and I do hereby declare that the following is a full, clear, and exact description of the construction and operation of the same, reference being had to the accompanying drawings, making a part of this specification, in which—

Figure 1:
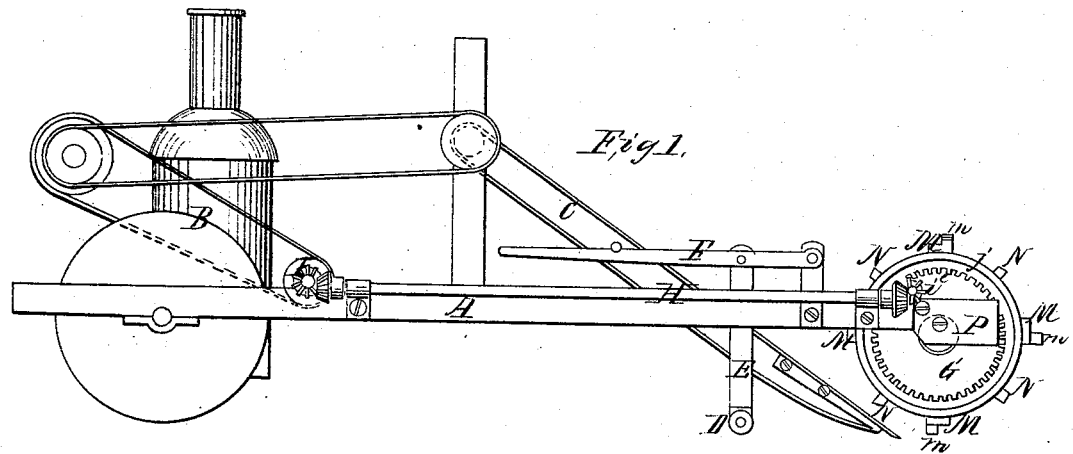
Figure 1 is a side view.

The object of this invention is to construct an excavating-machine, to be operated by steam or other power, which shall perform its work in an easier and more expeditious manner than those heretofore invented, and which shall be economical and convenient of operation.

The invention relates to the peculiar construction of the cutter, and when thus constructed, its combination with an inclined endless apron, which carries the dirt away, and delivers it from the side or rear of the machine.

In the drawings, A represents the frame of the machine; B B, the engine, boiler, &c., employed to drive it; C, an inclined endless apron, which receives the dirt from the cutter, elevates it to any desired height, and delivers it into an inclined spout, or upon another apron-carrier; D D, the forward wheels or rollers, supported by a frame, E, and capable of being adjusted up or down, by means of a lever, F; G, the cutting-cylinder; and H H, shafts operating the cutter, and themselves operated by a cross-shaft, I, worked from the engine.

The wheels or rollers D D work upon a fixed axle, attached by a king-bolt to the frame E, so that the machine can be guided in any direction at will, by swinging the axle on the king-bolt. Stops may be provided to confine this movement of the axle within certain limits.

Figure 2:
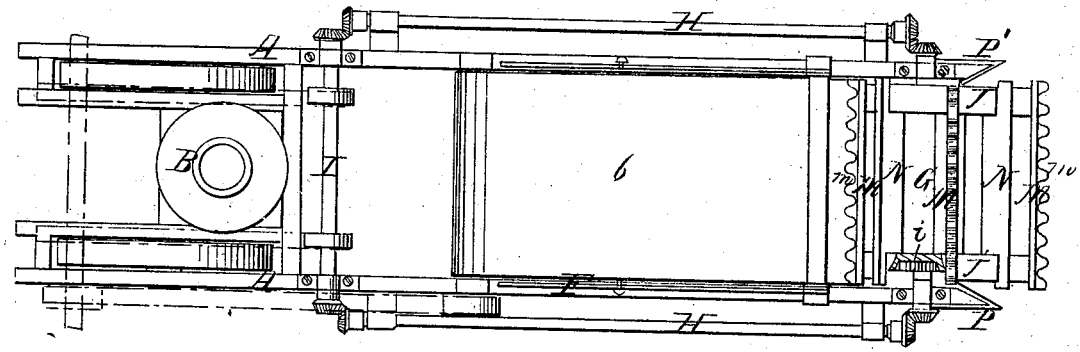
Figure 2 is a top view.

The cutting-cylinder is composed of two circular disks J J', united by a series of bars, M M, arranged as shown in the drawings, and bolted to the perimeter of the disks, and by a series of scraping-blades, N N, arranged as shown, and fastened to the disks in any convenient manner. The edge of the scraper-blades is bevelled, so as to cut the earth readily. The cutter-blades are attached to the flat outer side of the bars M M. Each cutter-blade is formed of a piece, $m$, of steel, bent into a serpentine shape, as shown in fig. 2, and bolted to the bars M M, the front edge of the piece, $m$, being made sharp, so as to cut the sod readily. The ends of the bars M M, N N, may project beyond the wheels or disks J J, so as to cut and scrape the whole width of the machine.

Sharp cutting-blades P P' are attached to the forward end of the side timbers of the frame, and project nearly to the front edge of the cutting-cylinder, being bevelled towards their outer edge, in order to cut smoothly through the soil, and cast it in towards the foot of the apron.

The object of these side cutters is to prevent the sides of the ditch from wedging against the frame A, when the machine is cutting a trench several feet in depth. By the use of them, the machine may be made to cut so deep that the body of the frame will be on a level with or even below the soil.

The wheels J J' are provided with concave gear $e$, on their outer side, in which runs a small pinion, $i$, driven by the side shafts H H, as above described.

Practical operation has demonstrated the great advantages of this machine over all others heretofore employed for a similar purpose.

The cutter $m$ is adapted to cut through either soil, sand, clay, mud, or other earth, with an ease which I have been unable to reach by the use of anything of a different form. The dirt having been thus separated from its bed, is then intercepted by the scraper-blades N N, and by them thrown upon the endless apron, which immediately removes it.

In no other machine has it been found practicable to move or "feed" the machine by the action of the cutters themselves, and without the use of drive-wheels, &c., operated directly from the engine. Such is the nature of this machine, however, that no difficulty whatever is experienced from this cause.

The cutting-cylinder not only loosens and removes the dirt, but, in the act of doing so, "feeds" the machine, or advances it to its work. The machine is in this way greatly simplified, no other driving-apparatus being needed than that which operates the cutting-cylinder.

Having thus described my invention,

What I claim as new, and desire to secure by Letters Patent, is—

1. The cutters $m$ $m$, when constructed in the sinuous form described and shown, and attached to the rotary cylinder G, in the manner specified.

2. The arrangement of the disk J J', connecting-bars M M, scraping-blades N N, and sinuous cutters $m$ $m$, when the several parts are constructed in the manner described.

3. In that class of excavators in which the rotary cutting-cylinder operates to move the machine forward in the manner herein described, the arrangement of such cylinder horizontally across the machine, in front of an inclined apron, C, so that the cylinder shall cut the dirt and throw it back upon the apron, while, at the same time, it draws the machine forward, substantially as described.

4. The arrangement of the horizontal rotary cylinder G, apron C, wheels D D, frame E, lever F, and side cutters P P, substantially as described.

To the above specification of my invention, I have signed my hand, this 13th day of August, 1868.

BARNA T. STOWELL.

Witnesses:
CHAS. A. PETTIT,
N. K. ELLSWORTH.